Figure 1:
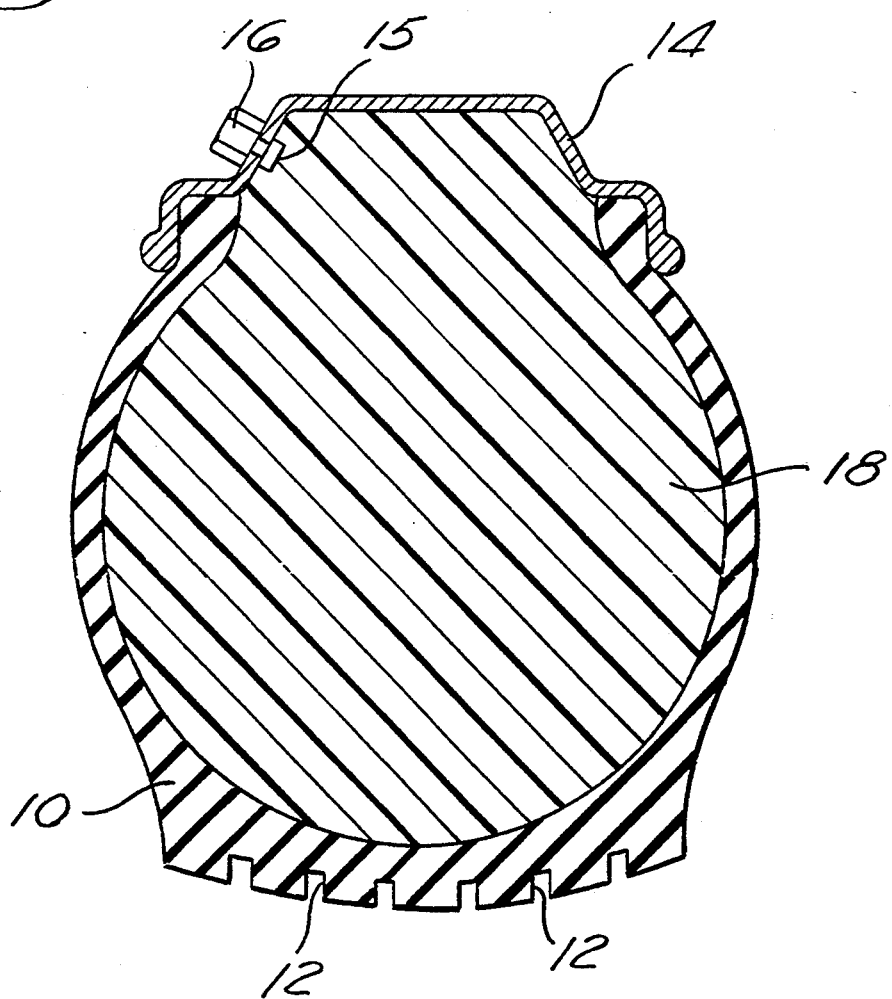

United States Patent [19]
Gupta

[11] Patent Number: 5,402,839
[45] Date of Patent: Apr. 4, 1995

[54] TIRE WITH POLYURETHANE/UREA COMPOSITION FILLING

[76] Inventor: Laxmi C. Gupta, 2852 Mainway Dr., Los Alamitos, Calif. 90720

[21] Appl. No.: 649,268

[22] Filed: Jan. 30, 1991

Related U.S. Application Data

[63] Continuation of Ser. No. 152,901, Feb. 5, 1988, abandoned.

[51] Int. Cl.6 .................................................. B60C 7/00
[52] U.S. Cl. ..................................... 152/313; 152/310
[58] Field of Search ............... 152/310, 313, 452, 516, 152/520; 524/871, 874, 848; 528/64, 66, 76, 77

[56] References Cited

U.S. PATENT DOCUMENTS

| Re. 29,890 | 1/1979 | Gomberg | 152/313 |
| 3,338,861 | 8/1967 | Mastin et al. | 260/33.6 |
| 3,714,110 | 1/1973 | Verdol et al. | 260/33.6 |
| 3,752,790 | 8/1973 | McShane et al. | 260/77.5 |
| 4,094,353 | 6/1978 | Ford | 152/310 |
| 4,324,867 | 4/1982 | Patton et al. | 521/159 |
| 4,556,703 | 12/1985 | Megna et al. | 528/49 |
| 4,683,929 | 8/1987 | Wyman | 152/313 |
| 4,701,476 | 10/1987 | Burchell et al. | 521/159 |

OTHER PUBLICATIONS

Kirk–Othmer, Encyclopedia of Chemical Technology, Third Edition, vol. 23, pp. 596–599.

*Primary Examiner*—Geoffrey L. Knable
*Attorney, Agent, or Firm*—Stetina Brunda & Buyan

[57] ABSTRACT

An economical composition capable of maintaining satisfactory Durometer hardness is formed by reacting a polyol, a polyisocyanate, and an aromatic polyamine in the presence of an extender oil. The polyisocyanate can be present in a first container of a kit and the aromatic polyamine can be present in a second container of the kit. The resulting composition can be employed in a flat-free pneumatic tire as well as for filling cracks in the surface of a structure.

29 Claims, 1 Drawing Sheet

TIRE WITH POLYURETHANE/UREA COMPOSITION FILLING

This application is a continuation of application Ser. No. 07/152,901, filed Feb. 5, 1988, now abandoned.

BACKGROUND

The present invention is directed to a polyurea-containing polyurethane composition useful as a filling material in pneumatic tires and in cracks in highways and concrete structures.

The pneumatic tire is unsurpassed in providing load support with maximum shock absorption for automobiles, trucks, aircraft, lift trucks, dock vehicles, military vehicles, municipal service equipment, golf carts, and the like. This superior performance results from a combination of the properties of the reinforced rubber casing and gas at a proper pressure. However, a major drawback to the use of gas-filled pneumatic tires is the inconvenience and danger posed by the tire being punctured. Tire failure, e.g., blow-outs, can result in human injury and equipment damage. In addition, a slow gas leak-results in improper inflation leading to premature tire wear and increased rolling resistance. Furthermore, in an industrial environment where scrap material is strewn along the floor or roadway, the use of gas-filled pneumatic tires must either be avoided or the debris must be constantly removed.

A variety of solutions designed to prevent or mitigate the puncture of pneumatic tires have been proposed and used. Liners of various types have been provided in the tire or between an inner tube and the tire casing serving to mitigate the effects of a tire casing being punctured. A more prevalent method for overcoming the problem is to convert pneumatic tires to solid or semi-solid composite tires. Such tires have gained a wide acceptance for certain mining, industrial, and construction uses where the added weight, and somewhat inferior dynamic performance, could be tolerated for permanent protection from flat tires.

Until recently, such solid deflation-proof tires have depended on the presence of a foamed elastomer filling. Since the foamed fillings in such tires are easily flexed, the tires have serious disadvantages. For example, excessive heat can build-up within the tire and cause the filler to breakdown during service. Filler breakdown reduces the amount of support provided by the foamed elastomeric material. The reduced support can cause severe casing damage. Moreover, the manufacture of a foamed elastomeric material necessitates that gases be generated in situ. Accordingly, the formation of a foamed filling within a tire casing creates gas volumes and pressures within the tire casing that are undefinable and unpredictable. To control this problem and assure uniformity from tire to tire necessitates expensive factory installation.

Because of the drawbacks of foamed polymers as fillers in pneumatic tires, U.S. Pat. No. Re. 29,890 ("Gomberg") proposed a pneumatic tire in which the casing was filled with an elastomeric material that is free of voids. (The terms "voids" and "void" as used herein denote the cellular formation caused by a foam producing material, e.g., carbon dioxide by-product of an isocyanate-water reaction, freon, or air mixed with the reactants.) Specifically, the elastomeric material was produced in the essential absence of a foam producing material in the reaction zone. Since the elastomeric material has less deflection than foam filled tires, superior heat build-up characteristics were obtained. Additionally, the elastomeric material was found to have a Durometer hardness in the range of about 25–43 on the A Scale. The use to which the pneumatic tire is put determines what is a satisfactory Durometer hardness for the elastomeric filling material. For light uses, e.g., golf carts, a Durometer hardness of up to 5 A is satisfactory. In contrast, for heavy duty industrial uses, e.g., fork lifts, earth movers, etc., a Durometer hardness of at least 20 A is satisfactory.

However, because the elastomeric material entirely fills the tire casing without voids, a significant drawback to the elastomeric material of Gomberg is the resultant very high cost of filling a tire. U.S. Pat. No. 4,683,929 ("Wyman") states that efforts to reduce the cost by diluting the elastomeric material filler material with extender oil can result in a sharp decrease in hardness.

To overcome the deficiency of Gomberg, Wyman added water as a reactant to produce carbon dioxide in the reaction zone, but cured the elastomeric material under conditions whereby the carbon dioxide is dissolved in the elastomeric material to produce a substantially void-free elastomeric filling material.

Wyman states that "as a result of the water reaction, a polyurea-containing polyurethane elastomer is obtained having superior hardness characteristics. Oil can be added while maintaining a Durometer hardness of at least 20 on the A scale. While a polyurea-containing elastomer generally has less oil compatibility on a weight basis than an all-urethane-containing elastomer, because of its very high Durometer hardness, it actually has higher oil compatibility for a particular level of Durometer hardness. In other words, whereas urethane systems can be oil-extended at a useful hardness level, the level of oil extension is limited by large decreases in hardness. On the other hand, elastomer prepared in accordance with [Wyman] can be extended by as much as 50 weight percent with oil and still yield a Durometer hardness of 30; at lower hardness levels, up to 60 weight percent oil can be added without bleeding from the elastomer at room temperature."

Pneumatic tires filled with the elastomeric material of Wyman can potentially suffer from premature failure due to the evolution of carbon dioxide dissolved in the elastomeric filling material.

Accordingly, there is a need for a pneumatic tire filling composition that it is neither subject to premature failure by the evolution of carbon dioxide nor prohibitively expensive.

SUMMARY

The present invention satisfies this need by providing (a) a substantially void-free polyurea-containing polyurethane elastomeric composition, (b) a process for forming the composition, (c) a kit comprising first and second containers capable of being combined to form the composition, and (d) a flat-free tire comprising a tire casing and the composition. By using the void-free polyurea-containing polyurethane elastomeric composition of the present invention, the cost of the elastomeric filling material can be reduced while avoiding potentially premature failure due to the evolution of carbon dioxide from the filling material.

The present invention provides a substantially void-free polyurea-containing polyurethane elastomeric composition formed by reacting a polyol, a polyisocyanate, and an aromatic polyamine. In order to reduce the cost of the elastomeric composition, the reaction preferably is performed in the presence of an extender oil. In general, the reaction takes place in the presence of up to about 65 weight percent extender oil. As used herein, the phrase "weight percent" means the weight of the particular ingredient divided by the total weight of all ingredients employed in formulating the composition, multiplied by 100 percent. Typically, cost reduction and suitable hardness can be obtained by reacting the polyol, the polyisocyanate, and the aromatic polyamine in the presence of about 25 to about 65 weight percent extender oil. Since cost reduction is directly proportional to the amount of extender oil in the composition, the reaction preferably takes place in the presence of about 45 to about 65 weight percent extender oil. By using sufficient aromatic polyamine, the resulting void free polyurea-containing polyurethane elastomeric composition can achieve a Durometer hardness of at least ° about 20 A despite the incorporation of about 20 to about 65 weight percent extender oil in the composition.

In order to expedite the reaction, it is preferred that the polyol, the polyisocyanate, and the aromatic polyamine be reacted in the presence of a polyurethane polymerization catalyst. In addition, to avoid forming voids in the composition, it is preferred that the reaction take place in the absence of a foam producing material. For example, it is preferred that less than 0.1 weight percent water be present during the reaction.

A kit can be employed to form the substantially void-free polyurea-containing polyurethane elastomeric composition. The kit comprises first and second containers that are capable of being combined to form the composition. The first container comprises a polyisocyanate. The second container comprises an aromatic polyamine. In addition, a polyol is distributed in the first and second containers in a preselected manner. The kit can further comprise an extender oil, a urethane polymerization catalyst, and/or a deforming agent also distributed in the first and second containers in a preselected manner. The urethane polymerization catalyst expedites the reaction between the polyol and the isocyanate. The defoaming agent is desirable in that it helps ensure the formation of a void-free composition. In an exemplary kit, the first container comprises the polyisocyanate, a portion of the extender oil, and the deforming agent, and the second container comprises the polyol, the remainder of the extender oil, the aromatic polyamine, and the polyurethane polymerization catalyst.

The substantially void-free polyurea-containing polyurethane elastomeric composition of the present invention can be used as a filling material in a flat-free tire. In addition, the composition can be employed to fill cracks in the surface of a structure.

DRAWINGS

Figure 2:
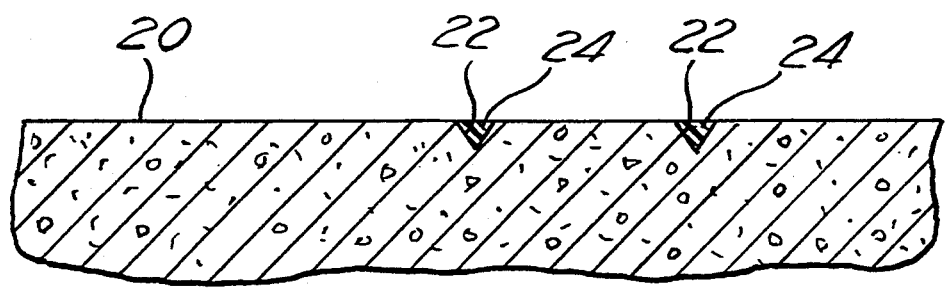

These and other features, aspects, and advantages of the present invention will become better understood with reference to the following description, appended claims, and accompanying drawings where:

FIG. 1 is a cross-sectional view of a conventional tire casing mounted on a vehicle wheel rim and filled with a composition embodying features of the present invention; and FIG. 2 is a cross-sectional view of a structure having a crack therein, the crack being substantially filled with a composition embodying features of the present invention.

DESCRIPTION

The present invention is directed to (a) a substantially void-free polyurea-containing polyurethane elastomeric composition; (b) a process for forming the composition; (c) a kit comprising first and second containers capable of being combined to form the composition; (d) a flat-free tire comprising a tire casing and the composition confined, at least in part, by the casing; and (e) a structure comprising a surface having at least one crack therein, the crack being substantially filled by the composition. Because of its ability to incorporate an extender oil without a sharp decrease in hardness, the composition of the present invention is cost effective. In addition, because carbon dioxide is not produced during the synthesis of the composition, a pneumatic tire which employs the composition as a filling material is not subject to premature failure by the evolution of carbon dioxide.

The composition of the present invention is prepared by reacting a polyol, a polyisocyanate, and an aromatic polyamine. The polyol can be chosen from a variety of OH terminated polyethers. Typical polyols are manufactured by polymerization of an aklylene oxide, such as ethylene oxide, propylene oxide, or butylene oxide, with a glycol. Polyethers having higher functionality may be obtained by reaction with a triol or higher polyol, such as glycerine, trimethylolpropane, and pentaerythritol. Commercially available polyols of the above types include, for example, Voranols ™ from Dow Chemical Company; Poly-G ™ from Olin Chemicals Division; and Pluracols ™ from BASF Wyandotte Corporation. Polyoxyalkylene polyols containing (a) 2–4 hydroxyl groups and (b) an aklylene group having 2–6 carbon atoms are preferred because their low viscosity enables them to be easily handled. In addition, they are relatively inexpensive compared to other polyols. Particularly, inexpensive are polyols consisting primarily of polypropylene-oxide triol.

The compatibility of the extender oil in the composition increases with increasing molecular weight of the polyol, assuming stoichiometry between the polyisocyanate and the polyol. In general, satisfactory compatibility is achieved when the polyol has a molecular weight of at least 3,000. Polyols having a molecular weight of up to about 10,000 are commercially available. However, hardness, as measured on the Durometer hardness A scale, decreases with increasing molecular weight. Accordingly, since both extender oil compatibility and hardness is desired, a balance is struck between these divergent considerations. This balance is facilitated by the present invention's provision of an aromatic polyamine reactant to react to form the polyurea-containing polyurethane composition.

Polyisocyanates known to and used in the art of forming polyurethane compositions can be employed to synthesize the composition of the present invention. Exemplary polyisocyanates include hexamethylene diisocyanate, 3,3'-dimethoxybenzidine-4,4'-diisocyanate; 4,4'-diphenylmethane diisocyanate (MDI); polymeric MDI; m-phenylene diisocyanate; p-phenylene diisocyanate (PDI); methylene-p-phenylene diisocyanate; 3,3'-dimethyl-4,4'-diphenyl diisocyanate (TODI); methylenebis(2-methyl-p-phenylene) diisocyanate; 3,3'-dimethoxy-4,4'-biphenylene diisocyanate, 2,2',5,5'-tetramethyl-4,4'-diphenylisopropylidene diisocyanate (DPDI); and 1,5-naphthylene diisocyanate (NDI) The aromatic diisocyanate are preferred because they are less flexible than, for example, alkylene diisocyanates, and therefore are capable of yielding an elastomeric composition having superior hardness. Blends of the 2,4 and 2,6-toluene diisocyanate isomers, e.g., an 80:20 blend, are commercially available, inexpensive, and very effective.

Aromatic polyamines capable of use in the present invention include, but are not limited to, methylene orthochlorodianaline (MOCA), methylene dianaline (MDA), meta-phenylenediamine (MPD), and diethylene toluene diamine (DETDA).

In order to reduce the cost of the composition of the present invention, it is preferred that the polyol, the polyisocyanate, and the aromatic polyamine be reacted in the presence of an extender oil. Extender oils include processing oils commonly used to extend polymers that would be compatible with an urethane elastomeric composition. In general, as the aromatic and polar content of the extender oil increases, the compatibility of the extender oil in the composition increases. This increase in compatibility is believed to be due to the presence of polar groups in the composition. Therefore, it is preferred that the extender oil be substantially aromatic and contain polar compounds.

Particularly effective extender oils are Califlux LP TM brand aromatic extender oil sold by Whitco Chemical Company and Dutrex 298 TM brand aromatic extender oil sold by Shell Chemical. Califlux LP brand extender oil comprises about 82 percent aromatics and about 7 percent polar compounds, the remainder being saturates. It has a specific gravity at 15.6° C. of about 0.9792, a °API gravity of about 13.0, a color of about D8.0, a viscosity at 40° C. of about 36cSt, a viscosity at 100° C. of about 4cSt, a pour point of about $-21°$ C., a flash point, coc, of about 160° C., a mixed analine point of about 30° C., an average molecular weight of about 325, a refractive index at 20° C. of about 1.5516, a viscosity gravity constant of about 0.952, a carbon analysis of about 39 percent aromatic carbon atoms, about 27 percent naphthenic carbon atoms, and about 34 percent paraffinic carbon atoms, and a weight of about 8.2 lbs. per gallon.

Acceptable Durometer hardness and composition integrity can be achieved while using up to 65 weight percent extender oil. Generally, from about 25 to about 65 weight percent extender oil is employed. However, since the cost of the composition is directly proportioned to the amount of extender oil present in the composition, it is preferred to use about 45 to about 65 weight percent extender oil in the composition. While the polyurea-containing polyurethane composition of the present invention is somewhat less compatible with extender oil than is an all urethane containing elastomeric composition, at any particular level of hardness the polyurea-containing polyurethane composition of the present invention exhibits better compatibility with the extender oil present in the composition than achievable with an all urethane elastomeric composition.

In order to expedite the reaction between the polyol and polyisocyanate, it is further preferred that the reaction take place in the presence of a polyurethane polymerization catalyst. Exemplary polyurethane polymerization catalysts include, but are not limited to, organo-tin catalysts. In addition, to avoid the formation of voids within the composition, it is preferred that a defoaming agent be employed during the processing and mixing of the reactants. A deforming agent is an anti-surfactant which reduces any frothing during the blending of the reactants. In general, sufficient deforming action can be achieved with the use of less than about 0.5 weight percent defoaming agent. To reduce the cost of the composition, while still maintaining acceptable defoaming action, it is preferred to use less than about 0.5 weight percent defoaming agent.

Substantially stoichiometric amounts of the polyisocyanate, the polyol, and the aromatic polyamine are used in the composition of the instant invention. In general, the ratio of isocyanate groups to the total amount of hydroxyl and amine groups, i.e., (isocyanate groups):(hydroxyl+amine groups), can be from about 0.911 to about 1.1:1. Typically, the ratio of isocyanate groups to hydroxyl and amine groups is from about 0.95:1 to about 1.05:1. The particular amounts of these ingredients is selected so that suitable hardness and curing times are achieved. In general, the more aromatic polyamine present in the reactants, the faster the composition cures, and the higher is the hardness of the resulting composition.

In order to avoid forming voids and to avoid interfering with the stoichiometry of the reactants, it is preferred that the reaction take place in the absence of a foam producing material. Because water can react with isocyanate to form carbon dioxide, it is therefore preferred that the various ingredients contain as little water as possible. In this respect, the water content of the reaction mixture is preferably below about 0.1 weight percent and more preferably below about 0.05 weight percent. The water content of commercially available chemicals is such that the water content of the reaction mixture can readily be kept below about 0.08 weight percent.

The ingredients used in forming the composition of the present invention are conveniently distributed between two containers. A first container comprises the polyisocyanate and a second container comprises the aromatic polyamine. The remaining ingredients employed in forming the composition are distributed in a preselected manner between the first and second containers. For example, the first container can comprise the polyisocyanate, a portion of the extender oil, and the deforming agent, while the second container can comprise the polyol, the remaining portion of the extender oil, the aromatic polyamine, and the polyurethane polymerization catalyst.

The two containers can be combined at ambient temperature. Preferably, the two containers are combined at a temperature of from about 50° to about 90° F. Nevertheless, the containers can also be combined at an elevated temperature, e.g., up to about 200° F. In general, the higher the temperature at which the containers are combined, the faster the reaction between the ingredients and the closer will the reaction approach completion. However, there is no need to combine the containers or conduct the reaction at temperatures employed to react a blocked isocyanate group, e.g., an isocyanate group blocked with a monofunctional hydroxy or hydrogen compound. Accordingly, it is preferred that the containers be combined and that the reaction take place at a temperature lower than the temperature required to react a blocked isocyanate group with an amine. Typically, a temperature of about 250° F. is required to react a blocked isocyanate group with an amine.

The substantially void-free polyurea containing polyurethane elastomeric composition has several utilities.

For example, the composition can be employed as a fill material in a pneumatic tire. Methods for filling pneumatic tires an elastomeric filling material are well known. See, for example, the detailed description given in U.S. Pat. No. Re. 59,890, which is incorporated herein by reference.

With reference to FIG. 1, in general, a conventional tire casing 10 having a road-engaging tread 12 thereon is mounted on a rim 14 of a vehicle wheel (not shown). The rim 14 has an opening 15 for a valve stem 16 through which a liquid polymer formed by mixing the various ingredients is pumped into the tire. After partial filling, entrapped air is released by puncturing the tire opposite the opening 13 to provide a gas escape outlet. When all air is displaced by the liquid polymer, the puncture is sealed with a flat head metal screw. Final liquid polymer pressure is adjusted to be about the same as used with air to firmly secure the tire casing 10 to the rim 14 and prevent slippage. When fully pressurized, the tire liquid polymer supply inlet is sealed and the polymer is cured to full hardness before use. Accordingly, the space confined by the rim 14 and casing 10 is filled with the composition 18 of the present invention, thereby forming a substantially void-free elastomeric material. In addition, a continuous process for tire filling can be used. An exemplary continuous process is described in U.S. Pat. No. 4,683,929, which is incorporated herein by reference.

With reference to FIG. 2, a surface 20 having at least one crack 22 therein can be substantially filled with an elastomeric composition 24 within the scope of this invention.

EXAMPLES

In these examples, several elastomeric compositions are formulated. The characteristics of the formed compositions are evaluated.

EXAMPLE 1

The kit listed in Table I was prepared:

TABLE I

| Ingredient | Weight Percent of Final Composition |
|---|---|
| Container A | |
| TDI[1] | 4.15 |
| Extender Oil[2] | 45.85 |
| Defoaming Agent[3] | .025 |
| Container B | |
| Extender Oil[2] | 9.15 |
| Triol[4] | 39.55 |
| Aromatic Polyamine[5] | 1.20 |
| Catalyst | .045 |

[1]. TDI was an 80:20 percent by weight (pbw) blend of 2,4-toluene diisocyanate and 2,6-toluene diisocyanate.
[2]. The extender oil employed was Califlux LP brand extender oil manufactured by Whitco Chemical Company, New York, N.Y.
[3]. The defoaming agent employed was PC-1244 ™ brand defoamer manufactured by Mansanto Polymer Products Co., St. Louis, Missouri.
[4]. The triol employed was Poly G 85-29 brand triol having a molecular weight of about 6,000 manufactured by Olin Chemicals, Stanford, Connecticut.
[5]. The aromatic polyamine was m-phenylenediamine manufactured by DuPont.
[6]. The catalyst was Formrez UL-22 brand organic catalyst manufactured by Whitco Chemical Company, New York, N.Y.

The ingredients of Container A were mixed at ambient temperature. An isocyanate content of about 4 percent ±0.1 percent was achieved. The batch could be adjusted to the required isocyanate content by adding an additional amount of isocyanate.

The m-phenylene diamine was melted in a little portion of polyol. Subsequently, the rest of the additives were added to Container B. Containers A and B were then blended at ambient temperature. The moisture content was kept below about 0.08 weight percent.

The combined mass of Containers A and B had a work life of about 18 to about 20 minutes. The material obtained a Durometer hardness of about 30A. The resulting elastomeric material showed no oil bleed at room temperature.

In addition, a half-pint can was filled with the combined material of Containers A and B. The can was closed and left for 16 hours at 300° F. Upon opening, the elastomer had a Durometer hardness of about 40 A.

EXAMPLE 2

The kit listed in Table II was prepared:

TABLE II

| Ingredient | Weight Percent of Final Composition |
|---|---|
| Container A | |
| Polyisocyanate[7] | 6.15 |
| Extender Oil[2] | 43.85 |
| Defoaming Agent[3] | 0.025 |
| Container B | |
| Extender Oil[2] | 11.15 |
| Triol[4] | 37.85 |
| Aromatic Polyamine[5] | 1.00 |
| Catalyst[6] | 0.01 |

[2-6] are as defined in Table I.
[7]. The polyisocyanate was Isonate 143L brand polyisocyanate manufactured by Dow Chemical, Midland, Michigan.

The isocyanate content Container A was 3.6±0.1 weight percent. Upon mixing Containers A and B, the resulting material had a work life of about 28 minutes. The elastomer was cured for about 1 hour at about 200° F. The resulting composition had a Durometer hardness of about 10 A and exhibited a slight oil bleed.

EXAMPLE 3

The kit in Table III was prepared;

TABLE III

| Ingredient | Weight Percent of Final Composition |
|---|---|
| Container A | |
| Polyisocyanate[7] | 7.30 |
| Extender Oil[2] | 42.70 |
| Defoaming Agent | 0.025 |
| Container B | |
| Extender Oil[2] | 17.30 |
| Triol[4] | 30.95 |
| Aromatic Polyamine[5] | 1.75 |
| Catalyst[6] | 0.005 |

[2-7] are as defined in Example 2.

The polyisocyanate content of Container A was 4.3 weight percent. The reaction mixture formed by combining Containers A and B had a work life of about 8 minutes and achieved a Durometer hardness of about 18A after being cured for about 1 hour at about 200° F.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A flat-free tire comprising a tire casing and a substantially void-free polyurea-containing polyurethane elastomer filling material confined, at least in part, by the casing, said filling material being formed by the reaction of:
  polyether polyol;
  an aromatic polyisocyanate having plurality of isocyanate groups capable of reacting with an aromatic polyamine at a temperature of less than approximately 250° F.;
  an aromatic polyamine present in an amount greater than approximately 2.6% by weight of the polyol present but less than approximately 5.0% by weight of the polyol present; and wherein said reaction is carried out;
  (a) at a temperature less than approximately 250° F.;
  (b) in the presence of less than approximately 0.1% by weight water; and
  (c) in the presence of more than about 25% by weight aromatic extender oil.

2. The flat-free tire of claim 1 wherein said reaction is further carried out:
  (d) in the presence of at least one urethane polymerization catalyst.

3. The flat-free tire of claim 1 wherein said reaction is carried out in the presence of between 25% and 65% by weight aromatic extender oil.

4. The flat-free tire of claim 1 wherein said reaction is carried out in the presence of between 45% and 65% by weight aromatic extender oil.

5. The flat-free tire of claim 1 wherein said aromatic polyisocyanate is selected from the group consisting of:
  hexamethylene diisocyanate;
  3,3'-dimethoxybenzidine-4,4'-diisocyanate;
  4,4'-diphenylmethane diisocyanate;
  polymeric diphenylmethane diisocyanate;
  m-phenylene diisocyanate;
  p-phenylene diisocyanate;
  methylene-p-phenylene diisocyanate;
  3,3'-dimethyl-4,4'-diphenyl diisocyanate;
  methylenebis (2-methyl-p-phenylene) diisocyanate;
  3,3'-dimethoxy-4,4'-biphenylene diisocyanate;
  2,2',5,5'-tetramethyl-4,4'-diphenylisopropylidene diisocyanate;
  1,5-napthylene diisocyanate; and,
  toluene diisocyanate.

6. The flat-free tire of claim 1 wherein said aromatic polyisocyanate comprises a blend of 2,4 and 2,6-toluene diisocyanate.

7. The flat-free tire of claim 6 wherein the polyisocyanate comprises 80% by weight, 2,4-toluene diisocyanate and 20% by weight 2,6-toluene diisocyanate.

8. The flat-free tire of claim 1 wherein said polyether polyol has a molecular weight of at least 3,000.

9. The flat-free tire of claim 1 wherein said aromatic polyamine is selected from the group consisting of:
  methylene orthochlorodianaline;
  methylene dianaline;
  meta-phynlenediamine; and,
  diethylene toluene diamine.

10. The flat-free tire of claim 1 wherein the types and relative amounts of polyisocyanate, aromatic polyamine and extender oil are adjusted to obtain an elastomeric material having a Durometer hardness of at least 20 A.

11. The flat-free tire of claim 1 wherein said extender oil comprises about 82% aromatics, about 7% polar compounds and about 11% saturates.

12. The flat-free tire of claim 1 wherein said extender oil has a specific gravity of about 0.9792 at 15.6° C.

13. The flat-free tire of claim 1 wherein said temperature less than 250° F. is ambient temperature.

14. A flat-free tire comprising a tire casing and a substantially void-free polyurea-containing polyurethane elastomer filling material, said filling material being confined, at least in part, by the casing, and said filling material being formed by the reaction of:
  approximately 4.15% by weight toluene diisocyanate;
  approximately 55.00% by weight extender oil;
  approximately 0.025% by weight defoaming agent;
  approximately 39.55% by weight triol;
  approximately 1.20% by weight aromatic polyamine;
  approximately 0.045% by weight urethane polymerization catalyst.

15. The flat-free tire of claim 14 wherein said toluene diisocyanate comprises an 80:20% weight/weight blend of 2,4-toluene diisocyanate and 2,6-toluene diisocyanate.

16. The flat-free tire of claim 14 wherein said triol has a molecular weight of about 6,000.

17. The flat-free tire of claim 14 wherein said extender oil comprises about 82% aromatics, about 7% polar compounds and about 11% saturates.

18. The flat-free tire of claim 14 wherein said extender oil has a specific gravity of about 0.9792 at 15.6° C.

19. The flat-free tire of claim 14 wherein said filling material is further formed by:
  (a) blending said approximately 4.15% by weight toluene diisocyanate, said approximately 0.025% by weight defoaming agent and approximately 45.85% by weight of the said extender oil in a first container;
  (b) blending said approximately 39.55% by weight triol, said approximately 1.20% by weight aromatic polyamine, said approximately 0.045% catalyst and the remaining approximately 9.15% by weight of the extender oil in a second container; and
  (c) subsequently blending the contents of said first container with the contents of said second container, at ambient temperature.

20. A flat-free tire comprising a tire casing in a substantially void-free polyurea-containing polyurethane elastomer filling material confined, at least in part, by the casing, said filling material being formed by the reaction of:
  approximately 6.15% by weight aromatic polyisocyanate;
  approximately 55% by weight extender oil;
  approximately 0.025% by weight defoaming agent;
  approximately 37.85% by weight triol;
  approximately 1.00% by weight aromatic polyamine;
  approximately 0.01% by weight urethane polymerization catalyst.

21. The flat-free tire of claim 20 wherein said triol has a molecular weight of about 6,000.

22. The flat-free tire of claim 20 wherein said extender oil comprises about 82% aromatics, about 7% polar compounds and about 11% saturates.

23. The flat-free tire of claim 20 wherein said extender oil has a specific gravity of about 0.9792 at 15.6° C.

24. The flat-free tire of claim 20 wherein said filling material is further formed by:
  (a) blending said approximately 6.15% by weight aromatic polyisocyanate, said approximately 0.25% by weight defoaming agent and approximately 43.85% by weight of the said extender oil in a first container;
  (b) blending said approximately 37.85% by weight triol, said approximately 1.00% by weight aromatic polyamine, said approximately 0.01% by weight urethane polymerization catalyst and the remaining approximately 1.15% by weight of the extender oil in a second container; and (c) subsequently blending the contents of said first container with the contents of said second container and subsequently curing said filling material for about one hour at about 200° F.

25. A flat-free tire comprising a tire casing and a substantially void-free polyurea-containing polyurethane elastomer filling material confined, at least in part, by the casing, said filling material being formed by the reaction of:

approximately 7.30% by weight aromatic polyisocyanate;
approximately 60.00% by weight extender oil;
approximately 0.025% by weight defoaming agent;
approximately 30.95% by weight triol;
approximately 1.75% by weight aromatic polyamine;
approximately 0.005% by weight urethane polymerization catalyst.

26. The flat-free tire of claim 25 wherein said triol has a molecular weight of about 6,000.

27. The flat-free tire of claim 25 wherein said extender oil comprises about 82% aromatics, about 7% polar compounds and about saturates.

28. The flat-free tire of claim 25 wherein said extender oil has a specific gravity of about 0.9792 at 15.6° C.

29. The flat-free tire of claim 25 wherein said filling material is further formed by:

(a) blending said approximately 7.30% by weight aromatic polyisocyanate, said approximately 0.025% by weight defoaming agent and approximately 42.70% by weight of said extender oil in a first container;

(b) blending said approximately 30.95% by weight triol, said approximately 1.75% by weight aromatic polyamine, said approximately 0.005% by weight urethane polymerization catalyst and the remaining approximately 17.30% by weight of
the extender oil in a second container; and (c) subsequently blending the contents of said first container with the contents of said second container and curing said filling material for about one hour at about 200° F.

* * * * *